Nov. 8, 1955  C. D. J. SMITH  2,722,968
TREE SEAT
Filed Feb. 12, 1953
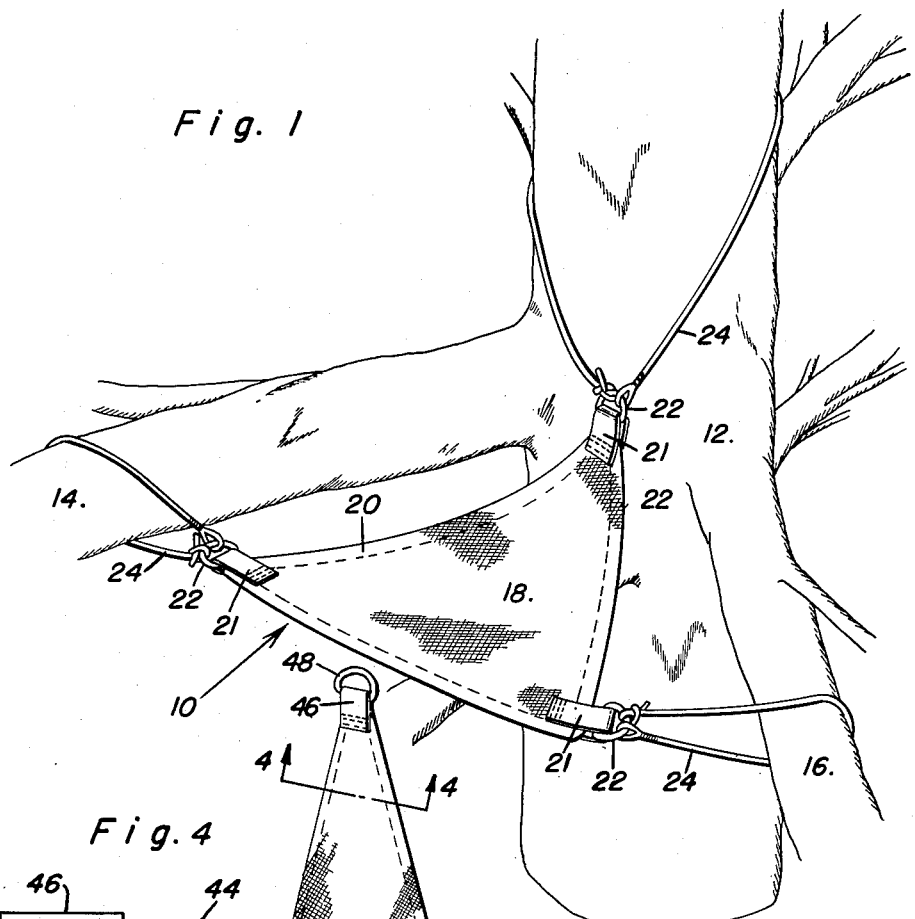
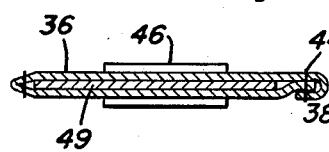
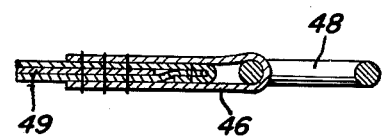
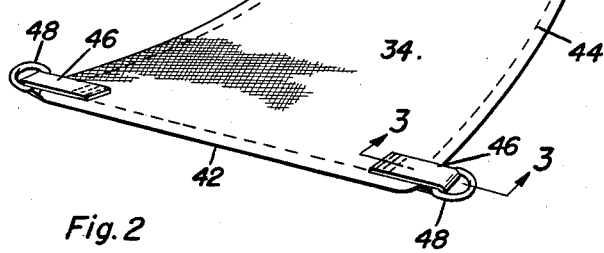
Claude D. J. Smith
INVENTOR.
BY *Clarence A. O'Brien*
and *Harvey B. Jacobson*
Attorneys

United States Patent Office 2,722,968
Patented Nov. 8, 1955

2,722,968

TREE SEAT

Claude D. J. Smith, Austin, Tex.

Application February 12, 1953, Serial No. 336,501

1 Claim. (Cl. 155—78)

This invention relates to a tree seat, and more particularly to a device which may be secured about the limbs of a tree so as to provide a secure perch for a hunter.

The primary object of this invention resides in the provision of a tree seat which may readily and easily be secured to the limbs of a tree and about the trunk thereof so as to provide a three-point suspension to ensure a satisfactory perch and gun platform for a hunter who is stalking game from the tree perch.

A further object of this invention is to provide a tree seat which has portions thereof which may be used as a seat and a portion which may be used as a back rest to provide added comfort to the hunter.

The construction of this invention features the use of a triangular-shaped tree seat which is adapted to be secured by suitable tie strings passing through D-rings. The tie strings are secured about the various limbs of a tree in an adjustable manner so as to provide a substantially horizontal seat for a hunter.

Still further objects of the invention reside in the provision of a tree seat which is strong and durable, simple in construction and manufacture, and capable of being readily carried by a hunter with his equipment since it is extremely light in weight.

These, together with the various ancillary objects and features of the invention which will become apparent as the following description proceeds, are attained by this tree seat, preferred embodiments of which have been illustrated in the accompanying drawings, by way of example only, wherein:

Figure 1 is a perspective view showing one form of the invention as secured about the limbs and trunk of a tree;

Figure 2 is a perspective view of a modified form of the invention employing a support member shaped as an isosceles triangle so as to provide a seat portion and a back rest portion;

Figure 3 is a sectional detail view as taken along the plane of line 3—3 in Figure 2; and Figure 4 is a sectional view as taken along the plane of line 4—4 in Figure 2.

With continuing reference to the accompanying drawings, wherein like reference numerals designate similar parts throughout the various views, and with particular attention to Figure 1, it will be seen that herein there is embodied a tree seat generally designated as 10 comprising the present invention, which is adapted to be secured, as shown in the drawings, about the trunk 12 of a tree and about the limbs 14 and 16 thereof. Various limbs may be chosen, depending on the configuration of the tree, on which to secure the seat and the seat may be attached to a tree above a limb suitable for use as a foot rest. The tree seat includes a triangular-shaped support member 18 which may be made from canvas, rubberized cloth, or any suitable material. If it is desired, the support member 18 may optionally be made water-proof. The support member 18 is provided with a reinforcing seam 20 along the peripheral edges thereof. Reinforcing straps 21 are provided at the apices of the support member 18 for reception of fastening rings 22 of D-shape which extend therethrough and reinforce the corners. Draw strings 24 are provided, each of which is secured by a girth hitch to the D-rings. The draw strings 24 are then tied about selected limbs of the tree.

Referring now to the form of the invention as generally designated by reference numeral 30 and as shown in Figure 2, it will be seen that herein the support member 32 is provided with a seat portion 34 and a back rest portion 36 formed by making the support member 32 in the shape of an isosceles triangle having the sides 38 and 40 of substantially greater length than the side 42. The support member 32 is provided with a seamed peripheral edge 44 for reinforcing the structure and reinforcing straps 46 are provided at the apices of the triangular-shaped support portion 32 for reception of fastening rings 48. Suitable tie strings, similar to those shown at 24 in Figure 1, are used for securing this form of the invention in a position where the back rest portion 36 and the apex at the upper corner thereof is tied substantially higher than the portions adjacent the base 42. This ensures that a suitable seat portion 34 and back rest portion 36 will be available to increase the hunter's comfort while providing a three point suspension and steady gun platform for the hunter. In order to increase the comfort of the hunter, it is within the concept of this invention to optionally provide a cotton, wool, or other insulator 49 between various thicknesses of the material such as canvas, rubberized cloth, or other material from which the support member 32 is formed which is substantially water-proof.

Since from the foregoing, the construction and advantages of this tree seat are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

What is claimed as new is as follows:

A tree seat comprising a support member shaped as an isosceles triangle having two sides thereof substantially greater in length than the third side to form a seat portion and a back rest portion, said support member being reinforced along the peripheral edges thereof, straps secured to said member at the apices thereof, D-rings carried by said straps, and tie elements secured to said D-rings, said member having an inner liner of heat insulating material, said support member being substantially water-proof.

References Cited in the file of this patent

UNITED STATES PATENTS

| 662,647 | Howe | Nov. 27, 1900 |
| 2,496,216 | Kaminski | Jan. 31, 1950 |
| 2,549,679 | Foote | Apr. 17, 1951 |

FOREIGN PATENTS

| 11,379 | Great Britain | 1913 |
| 49,952 | Sweden | Aug. 13, 1921 |
| 424,101 | Germany | Jan. 16, 1926 |